United States Patent
Wilkendorf et al.

(10) Patent No.: US 6,733,666 B1
(45) Date of Patent: May 11, 2004

(54) FILTERING DEVICE, ESPECIALLY A SUCTION RETURN FILTER

(75) Inventors: Werner Wilkendorf, Ottweiler (DE); Holger Erich Wegmann, St. Ingbert (DE)

(73) Assignee: Hydac Filtertechnik GmbH, Sulzback (DE)

( * ) Notice: Subject to any disclaimer, the term of this patent is extended or adjusted under 35 U.S.C. 154(b) by 0 days.

(21) Appl. No.: 09/958,676

(22) PCT Filed: Jan. 21, 2000

(86) PCT No.: PCT/EP00/00440
§ 371 (c)(1),
(2), (4) Date: Oct. 12, 2001

(87) PCT Pub. No.: WO00/62898
PCT Pub. Date: Oct. 26, 2000

(51) Int. Cl.[7] .................. B01D 35/147; B01D 35/15
(52) U.S. Cl. .................. 210/130; 210/132; 210/133; 210/136; 210/172; 210/323.2; 210/423; 210/433.1; 210/438
(58) Field of Search .................. 210/130, 132, 210/133, 136, 172, 323.2, 422, 423, 428, 433.1, 434, 438, 441, 450, 451

(56) References Cited

U.S. PATENT DOCUMENTS 3,959,147 A * 5/1976 Oakley et al. ........... 210/323.2
6,217,755 B1 * 4/2001 Stifelman et al. ........... 210/116

FOREIGN PATENT DOCUMENTS

| DE | 3313297 | 10/1984 |
| DE | 4206420 | 9/1993 |
| DE | 19515962 | 10/1996 |
| WO | 9937907 | 7/1999 |

* cited by examiner

Primary Examiner—Matthew O. Savage
(74) Attorney, Agent, or Firm—Roylance, Abrams, Berdo & Goodman, LLP

(57) ABSTRACT

A filtering device, especially a suction return filter includes a filter housing having two useful connections and a tank connection, and accommodates at least one filter element. The filter housing also provided with three return valves, two of which are held in the closing position by spring loads. All of the return valves are combined as a module at one end of the filter housing. The remaining return valve is configured as an integral constituent part of one of the spring-loaded return valves, has an opposite opening direction relative to it, and is not spring loaded. This arrangement enables the return valve unit to have a compact arrangement which can be structurally easily connected to the filter housing at a central point.

8 Claims, 2 Drawing Sheets

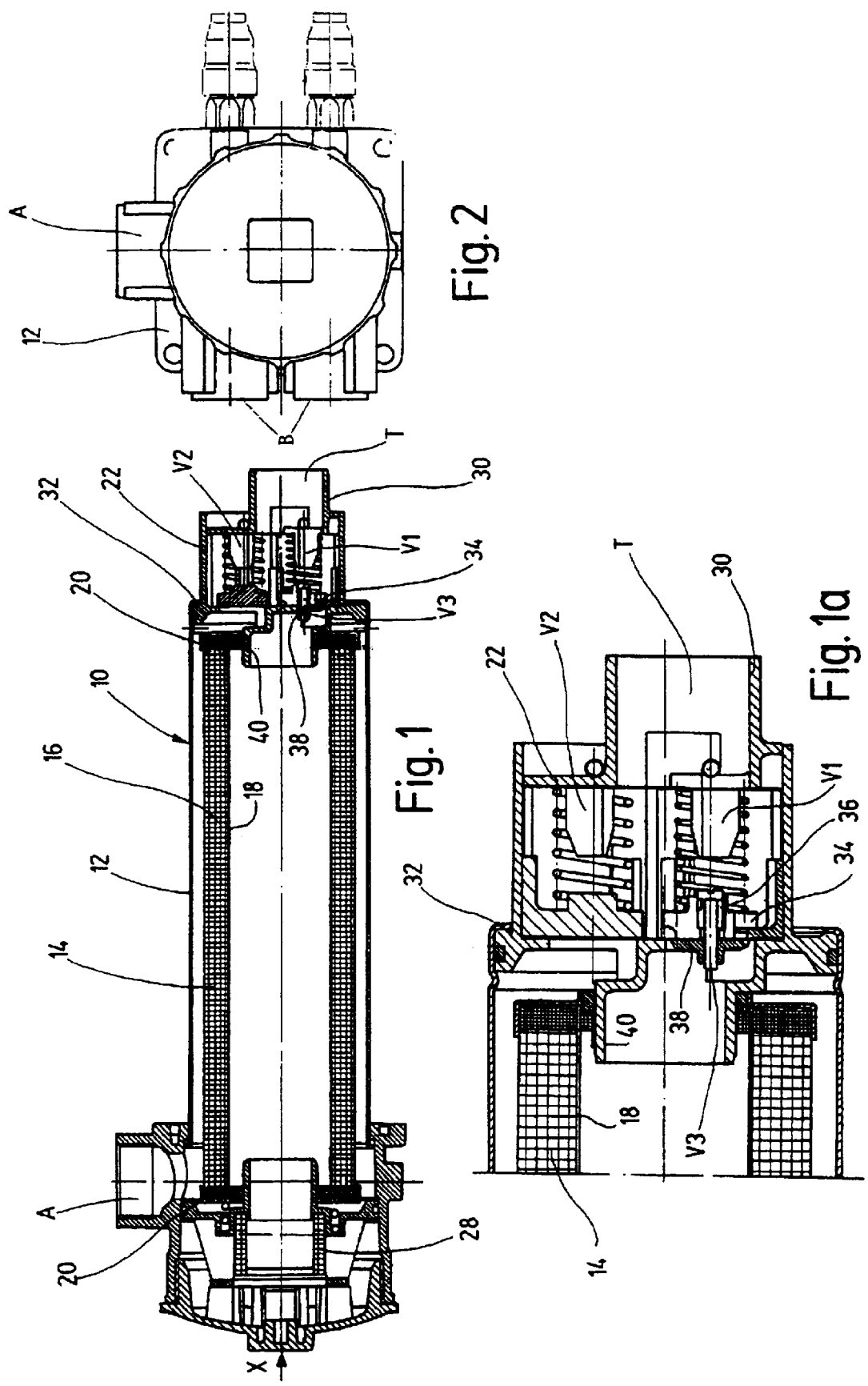

US 6,733,666 B1

FILTERING DEVICE, ESPECIALLY A SUCTION RETURN FILTER

FIELD OF THE INVENTION

The present invention relates to a filtering device, especially a suction return filter, having a filter housing which includes two utility connections and a tank connection. The filter housing serves as a holder of at least one filter element, and is provided with three non-return valves. Two of the non-return valves are maintained in closed settings under spring bias.

BACKGROUND OF THE INVENTION

In known filtering devices that are presently commercially available, the return valves are mounted at different points on the filter housing, and consequently, take up considerable structural space thereon. Futhermore, this arrangement increases the outlay for construction of the filtering device and raises its overall cost. Known solutions provide that primary filtered fluid can be fed to the user connected by a utility connection. The known suction return filters are provided primarily for use in the tank connection for an oil container. The filter housing and the utility and tank connections are designed such that they can withstand pressure peaks without damage. Use of a return valve guarantees that when a pressure peak occurs in the tank connection, and consequently in the tank or oil container, the resulting peak can be deconstructed by discharge in the direction of at least one of the utility connections.

DE 195 16 657 A1 discloses a filtering device for a telescopic-hydraulic cylinder of simple operation for raising and lowering a load surface or a loading platform or the like in or on trucks. One spring-loaded return valve is arranged in a bypass line to the filter element, while another spring-loaded return valve is connected to the rear of the bypass branch and the filter element. These spring-loaded return valves, together in one modular unit, facilitate the driving of the hydraulic cylinder with unfiltered fluid passing through the bypass. With the lowering or displacement of the hydraulic cylinder, the fluid moving in the direction of a collection container is filtered by the filter element, whereby the return valve in the bypass line is closed. Another, not spring-loaded return valve between a hydraulic pump and a valve arrangement for the control of the filter element protects against overload of the hydraulic pump in the case of an undesired reversal of the flow of the fluid. In another embodiment, a comparable arrangement includes a spring-loaded return valve in the bypass and two return valves having no spring load, one of them in another bypass line and one of them in the direct feed to the filtering element. The return valves, fitted within the filtering device as independent modular parts, likewise take up considerable structural space. With disruptions of the operation, exchange of the return valve is possible only with great difficulty.

A filtering device disclosed in DE 195 15 962 A1 serves in supplying a hydraulic user with hydraulic liquid. The associated hydraulic connection includes a tank connection for a supply tank, a hydraulic pump for making available the hydraulic liquid and a return filter, through which the hydraulic liquid flowing back from the hydraulic user is filtered. The leading edge of the return filter is connected through a line with the tank for the hydraulic liquid. A non-parallel connection includes a pressure limiting valve and a retrofitted suction valve and ends beneath the hydraulic liquid level of the supply tank. These two valves are spring-loaded return valves, the same as another spring-loaded return valve arranged between tank and filter element. The three spring-loaded return valves, as independent structural parts, form no interdependent modular unit, hut rather produce a hydraulic emergency supply for the user. The spring-loaded return valves in this case are mounted at different points and separated from one another on a part of the filtering device. This solution also embodies a large construction. Since the return valves are to be controlled hydraulically at different points, disruptions of the operation during operation of the device cannot be totally excluded.

SUMMARY OF THE INVENTION

Objects of the present invention are to provide an improved filtering device which is of low-cost construction and remains operationally reliable during operation.

According to the present invention, all of the return valves are arranged together as one modular unit at one end of the filter housing. The return valve opens in a direction counter to this and is in the form of an integral component part of one of the spring-loaded return valves. A compact arrangement of the entire return valve unit is possible and can be mounted in a constructively simple manner at a central point on the filter housing. This arrangement also simplifies the exchange of the modular unit for another modular unit, when an unexpected breakdown of any one of the return valves occurs.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view in section of a filtering device according to an embodiment of the present invention;

FIG. 1a is a partial side elevational view in section of the modular unit including the three return valves of the filtering device of FIG. 1;

FIG. 2 is an end view of the top end of the filtering device of FIG. 1; and

DETAILED DESCRIPTION OF THE INVENTION

Figure 3:
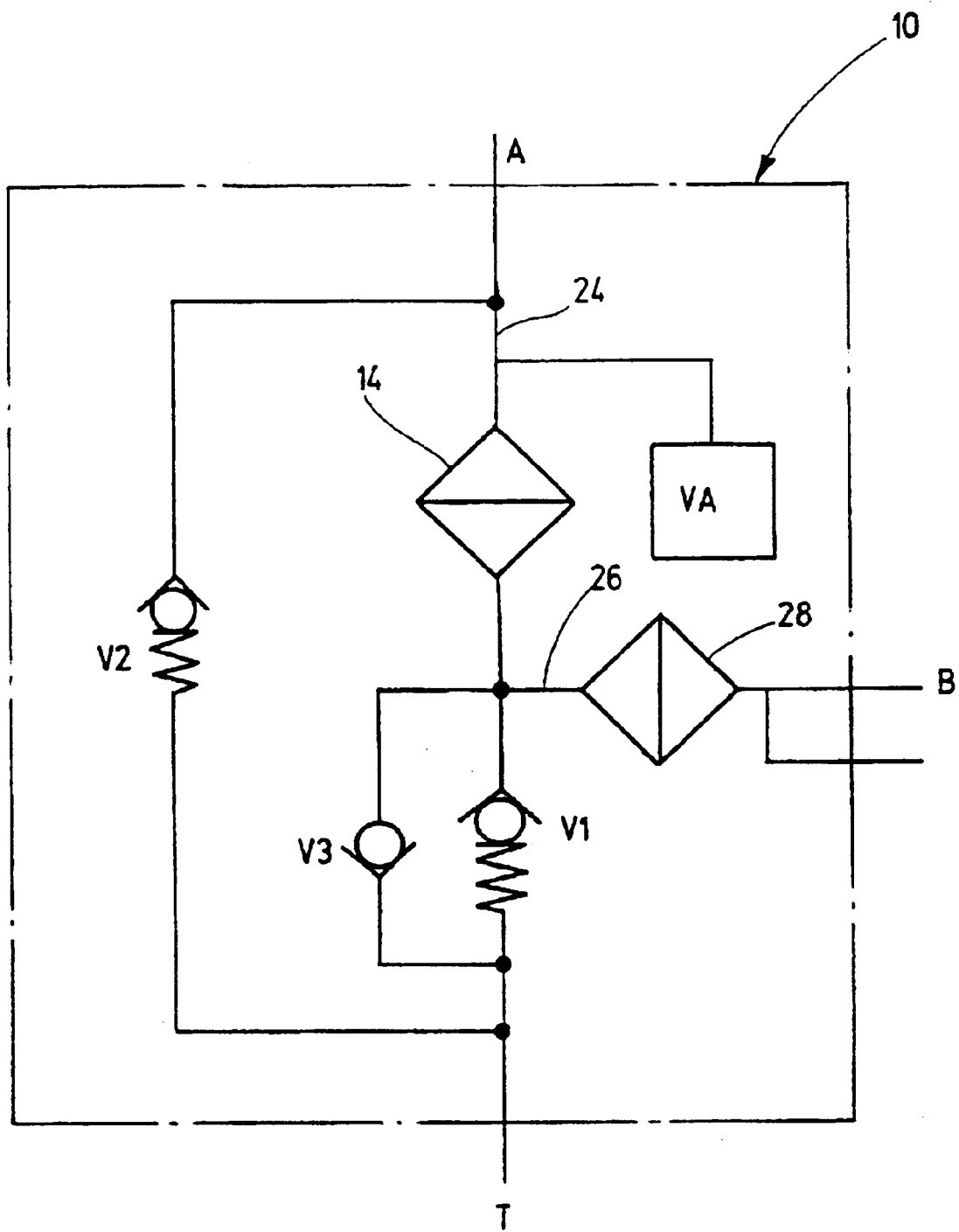
FIG. 3 is a hydraulic circuit diagram of the filtering device of the present invention.

The filtering device illustrated in the drawings relates to a suction return filter 10 having a filter housing 12 incorporating two utility connections A, B and one tank connection T. As shown in FIGS. 1 and 2, tank connection T is arranged at one end of filter housing 12. Utility connections A, B are on the opposite side, with utility connection B, as opposed to utility connection A as seen in longitudinal direction, offset from connection A around a radial angle of 90 degrees. Filter housing 12 envelops at least one filter element 14. The filtering mat 16 is laid out against a support pipe 18 arranged in the interior of filter element 14. Filter element 14 is guided at its free ends into end caps 20, which produce the connection of filter element 14 with filter housing 12 and create a sealed connection.

Suction return filter 10 also incorporates three return valves V1, V2 and V3. Return valves V1 and V2 are spring-loaded or spring-biased. The third return valve V3, as shown particularly in FIGS. 1 and 3, is not spring-loaded or spring-biased. As shown particularly in FIG. 1, all of the aforementioned return valves V1, V2 and V3 are combined in one modular unit 22 and are arranged on the free end opposite the top part of filtering housing 12. Return valve V3, free of spring load, is embodied as an integral component part of the spring-loaded return valve V1, with a direction of opening counter to that of valve V1.

Return valves V1, V2 and V3 are connected together all carrying fluid to tank connection T. Spring-loaded return valves V1 and V2 can be displaced in the direction of tank connection T to their open settings, as is shown in FIG. 3. Also shown in FIG. 3, return valves V1, V2 and V3 are connected in parallel relative to one another between tank connection T and utility connections A, B. In a first connection line 24 between the two spring-loaded return valves V1, V2, filter element 14 is connected. In another connection line 26 opening into the first connection line 24 between the two spring-loaded return valves V1, V2 and leading to utility connection B, another filter element 28 is arranged. Filter element 28 is preferably a mechanical filter in the form of a protecting screen or mesh. With normal operation of the filtering device, utility connection A represents the fluid-guiding input to filter element 14 where fluid flows from the exterior inward for the main filtration of the fluid. Downstream of filter element 14, the resulting uncontaminated fluid from the interior to the exterior flows to the other filter element 28 configured in the form of a protecting screen or the like. The fluid is then discharged through utility connection B. The utility connections A, B can be embodied in a plurality of different designs. Particularly, discharge B can be configured of two utility connections, as shown in FIG. 2.

As shown particularly in FIG. 1, modular unit 22 embodies a housing part 30 including return valves V1, V2 and V3 therein. Housing part 30 can be connected through a jointed flange connection 32 with filter housing 12. The resulting enclosure formed by the jointed flange connection over corresponding sealing devices, such as sealing rings, is to be fluid-tight. The spring force of spring-loaded return valve V1, combined with return valve V3 having no spring load, is lower than the spring force of the other spring-loaded return valve V2, so that return valve V1 is pressure-controlled and includes cyclically filtering filter elements 24, 28. In any case, spring-loaded return valve V1 opens before the spring-loaded return valve V2. Return valve V3 with no spring bias is located in closing part 34 of the associated spring-loaded return valve V1, is guided by means of a longitudinal guide 36, and can be controlled by means of the corresponding fluid pressure applied in the direction of its opening.

A screw bolt is provided as longitudinal guide 36, which is securely connected with the closing plate 38 of return valve V3. In longitudinal displacement, guide 36 engages through a middle opening in closing part 34 of return valve V1. Closing part 34 of return valve V1 is likewise configured as a plate and is supported in its closed setting as indicated on corresponding interior walls of housing part 30. In this case, the associated compression spring of return valve V1 presses closing part 34, in the direction of the drawing away from tank connection T and into the left end setting. Closing plate 38 of return valve V3 having no spring bias is supported in its closed setting, as shown in the drawings, both on closing part 34 and on the associated housing walls of housing part 30.

If the pressure in tank connection T rises, for example as a result of a pressure peak or the like in the tank, valve V3 opens counter to the fluid pressure in the interior of filter element 14. Valve V3 thereby frees the passage between tank connection T and utility connection B. If the pressure in the interior of filter element 14 is higher than the pressure in tank connection T, which is the general rule, valve V3 remains in its closed position. A predeterminable threshold value for valve V3 is dependent upon the closing force of spring-loaded return valve V1. The valve combination V1 and V3 opens, when the interior pressure in filtering element 14 is greater than the spring force of valve V1 in connection with the natural residual pressure in tank connection T, which pressure customarily corresponds to normal environmental or ambient conditions. Closing part 34 and closing plate 38 are then both displaced to the right in the direction of viewing of FIGS. 1 and 1a, insofar as closing plate 38 is not to be supported on the stationary wall parts of housing part 30. If however such a support is provided, as shown in the drawings, closing plate 38 remains in its closed contact position with housing part 30. Also, a fluid connection is then provided between closing part 34 and the interior chamber of filter element 14. Under that interior pressure, only closing part 34 can be moved to the right in the direction of the drawings into an open setting.

Housing part 30 engages with a fluid-permeable flange 40 in one end of filter element 14. This engagement forms a position-fixing arrangement for one end of filter element 14.

For better understanding of the present invention, the filtering device is explained in greater detail hereinafter relative to its principle function, as shown in FIG. 3. The contaminated fluid entering through input connection A is very finely filtered through filtering element 14, and is conducted thereafter through the coarse protecting screen 28 to utility connection B. The resulting arrangement can be used for the drive of building machinery, hydrostatic power drives or the like. A contamination level indicator VA monitors the level of contamination in filter element 14. If filter element 14, for example, becomes obstructed by an excessive degree of contamination, the rising pressure in utility connection A can be carried away into the tank without harm. Such pressure is eliminated or relieved through return valve V2 designed to be reinforced in the manner of a spring arrangement. Return valves V1, V3 in such a case remain in their closed position.

If pressure peaks occur in utility connection B in a direction counter thereto, in other words in the direction of utility connection A, spring-loaded return valve V1 can open in the direction of the tank. If pressure peaks arise in tank connection T, return valves V1 and V2 remain in their closed position, whereupon valve V3 opens in the direction of utility connection B. Thus, flowing but contaminated fluid is displaced from tank connection T into the device, but is at least coarsely cleaned by filtering through the alternate filter element 28. The flowthrough direction from A to B can be reversed, in other words from B to A, insofar as filter element 14 is of a construction suitable for this purpose, for example of a constructive design wherein the filtering device would be provided with an exterior support pipe.

The modular unit including return valves V1, V2 and V3 according to FIG. 3 provides a compact, versatile, multi-use operational unit. Upon breakdown, it can be easily exchanged for a replacement modular unit. The compact unit is of simple construction and can be produced at low cost and by simple manufacturing technology.

While one embodiment has been chosen to illustrate the invention, it will be understood by those skilled in the art that various changes and modifications can be made therein without departing from the scope of the invention as defined in the appended claims.

What is claimed is:

1. A suction return filter, comprising:

a filter housing having first and second operating connections and a tank connection;

a first filter element arranged within said filter housing to divide the housing into a first space in fluid communication with said first operating connection and a second space in fluid communication said second operating connection; and first, second and third non-return valves grouped as an assembly within a housing part at one end of said filter housing, said housing part defining said tank connection and having a first portion receiving said first and third valves and a second portion receiving said second, said first and second valves being spring biased to closed positions and being movable into open positions in a direction toward said tank connection, said third valve not being spring biased to a closed position and being an integral part of said first valve and being movable to an open position in a direction opposite to opening of said first valve, said first and third valves being arranged fluidly in parallel;

said first and third valves each including a first side in fluid communication with said second space and a second side in fluid communication with said tank connection, said second valve including a first side in fluid communication with said first space and a second side in fluid communication with said tank connection.

2. A suction return filter according to claim 1 wherein a second filter element is arranged in said housing and is disposed between said first filter element and said second operating connection.

3. A suction return filter according to claim 2 wherein said second filter element is a protective mesh.

4. A suction return filter according to claim 1 wherein said housing part is connected to said filter housing by a flange.

5. A suction return filter according to claim 4 wherein said flange of said housing part is permeable to fluid conveyed into said first filter element, and forms a locating attachment connected to said first filter element.

6. A suction return filter according to claim 1 wherein spring biasing forces of said first and third valves is less than a spring biasing force of said second valve.

7. A suction return filter according to claim 6 wherein said first and second filter elements are arranged in series between said first and second operating connections.

8. A suction return filter according to claim 1 wherein said third valve is guided for movement over a longitudinal guide on a closing part of said first valve and is controlled by fluid pressure at said first valve.

* * * * *